United States Patent [19]
Burgess

[11] 3,724,708
[45] Apr. 3, 1973

[54] PRESSURE-VACUUM RELIEF FUEL FILLER CAP

[75] Inventor: Ronald R. Burgess, Flushing, Mich.

[73] Assignee: F & E Manufacturing Company, Flint, Mich.

[22] Filed: Aug. 25, 1971

[21] Appl. No.: 174,667

[52] U.S. Cl..................220/44 R, 137/493, 251/144
[51] Int. Cl. .............................................B65d 51/16
[58] Field of Search........220/44 R; 215/56; 137/493; 251/144

[56] References Cited

UNITED STATES PATENTS

| | | | |
|---|---|---|---|
| 2,133,200 | 10/1938 | Kenneweg | 220/44 R UX |
| 2,133,575 | 10/1938 | Rosenberg | 137/493.2 |
| 2,256,139 | 9/1941 | Craig | 137/493 X |
| 2,526,197 | 10/1950 | Cannon et al. | 137/493 X |
| 3,061,138 | 10/1962 | Edelmann et al. | 220/44 R |

Primary Examiner—Samuel B. Rothberg
Assistant Examiner—James R. Garrett
Attorney—Barnes, Kisselle, Raisch & Choate

[57] ABSTRACT

A pressure-vacuum relief fuel filler cap assembly comprising a cover, a locking cup fixed to said cover, and a valve assembly fixed on said locking cup. The valve assembly comprises interfitting upper and lower valve body members made of plastic. A pressure relief valve and associated seat and a vacuum relief valve and associated seat are provided within the valve assembly. The pressure relief valve and vacuum relief valve include a common valve member.

12 Claims, 4 Drawing Figures

PATENTED APR 3 1973 3,724,708

INVENTOR
RONALD R. BURGESS
BY Barnes, Kisselle,
Raisch & Choate
ATTORNEYS

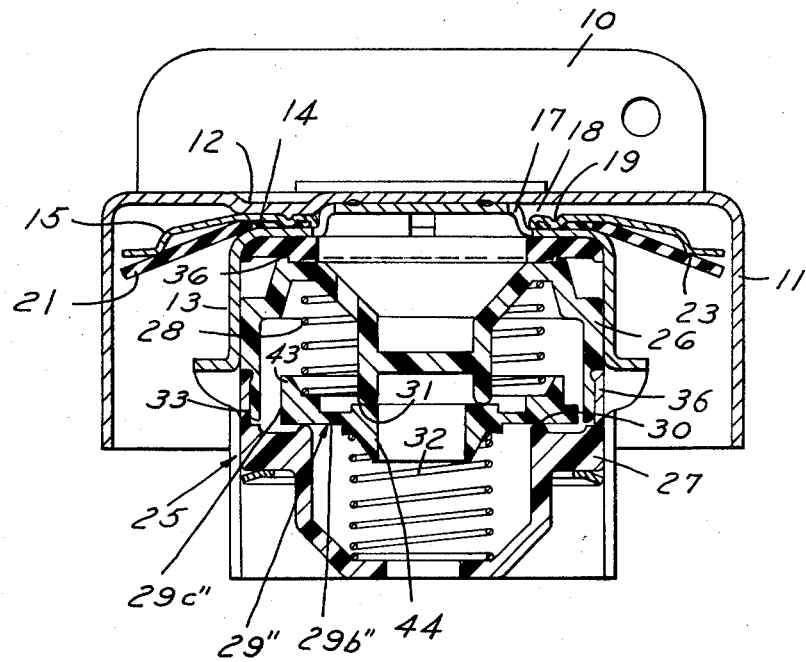
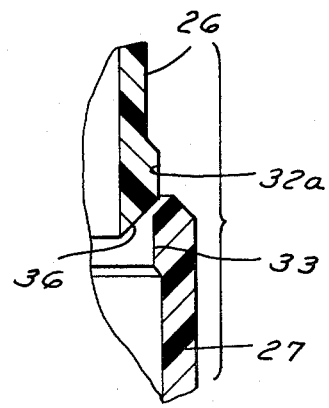

PRESSURE-VACUUM RELIEF FUEL FILLER CAP

This invention relates to fuel filler caps.

BACKGROUND OF THE INVENTION

"Evaporative loss control" or "evaporative emission control" are terms in general use to define a control, or method of controlling, hydrocarbon emissions to the atmosphere caused by evaporation of fuel. Included in this definition are those losses of evaporative nature from carburetor fuel bowl venting systems and from fuel tank venting systems.

When a hot engine is shut down, for instance, the residual heat in the engine can raise fuel bowl temperatures in some cases above 200°F. It is not unusual that under certain climatic, and geographic conditions that the fuel bowl will boil completely dry, emitting the associated evaporated hydrocarbons to the atmosphere.

Fuel tank evaporative losses can occur in much the same manner although the associated temperatures involved are somewhat reduced. If a fuel tank is filled with relatively cool fuel from underground storage tanks and then left to stand under high ambient temperature conditions, an actual loss of liquid fuel occurs, as well as an evaporative loss. These losses occur through either vented fuel tanks or vented fuel filler caps; whichever are employed for the purpose of preventing fuel tank rupture and or pressure differentials which may affect fuel pump operation.

The losses so described have been estimated to be 10-15 percent of the total hydrocarbon discharge to the atmosphere associated with internal combustion engines. Some jurisdictions have legislated control of these losses.

There are in general two control systems being utilized by the industry. The first system is generally called a vapor-recovery system wherein the vapors are directed to the crankcase and utilizes a pressure vacuum relief fuel filler cap as a means of protecting the fuel tank from structural damage due to excessive pressure differentials caused during severe operation or by system malfunction. The system is considered to be fail safe as the fuel filler cap design eliminates the possibility of damage to the system which may be hazardous.

The second system is generally called an adsorption-generation system, and is similar to the first system except that a charcoal canister is utilized to entrap vapors for later burning. This system also utilizes a pressure vacuum relief fuel filler cap.

Among the objects of the invention are to provide a combined pressure-vacuum relief fuel filler cap which is adapted to vent excess pressure as well as relieve vacuum in an evaporative loss system or an evaporative emission control system; which is easily constructed; and which will effectively operate within predetermined limits.

SUMMARY OF THE INVENTION

A pressure-vacuum relief fuel filler cap assembly comprising a cover, a locking cup fixed to said cover, and a valve assembly fixed on said locking cup. The valve assembly comprises interfitting upper and lower valve body members made of plastic. A pressure relief valve and associated seat and a vacuum relief valve and associated seat are provided within the valve assembly. The pressure relief valve and vacuum relief valve include a common valve member.

DESCRIPTION OF THE DRAWINGS

FIG. 3 is a vertical sectional view of a further modified form of fuel filler cap.

FIG. 4 is a fragmentary sectional view on an enlarged scale of a portion of FIG. 1.

DESCRIPTION

Figure 1:
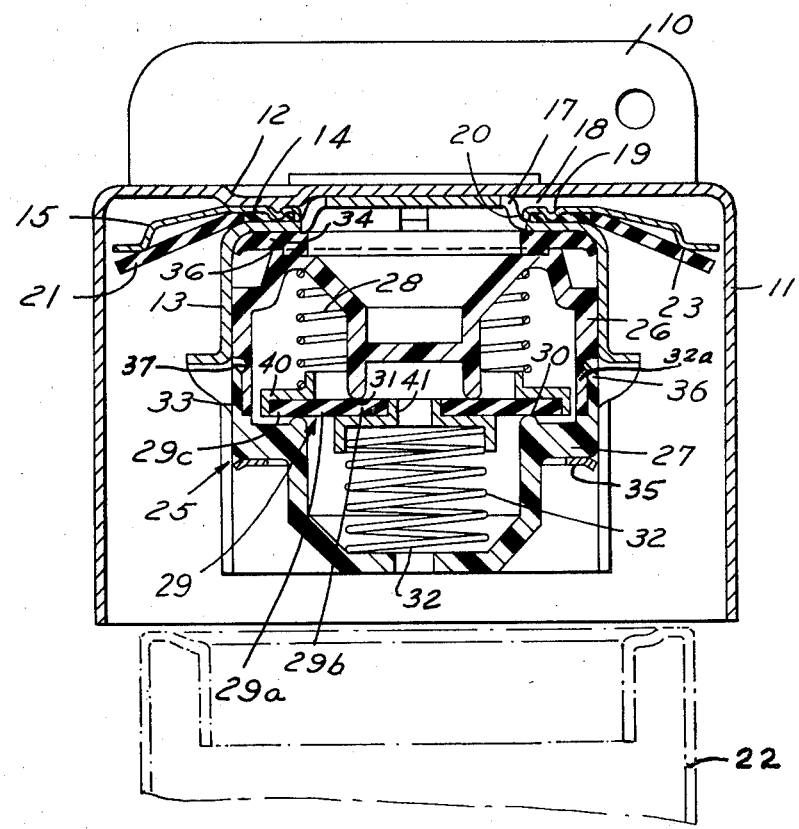
FIG. 1 is a vertical sectional view of the fuel filler cap embodying the invention.

Referring to FIG. 1, a handle 10, and cover 11 are projection welded together. The handle 10 is oriented with the depressions 12 and any lettering on the cover 11 so that the wording will not be obscured by the handle 10.

A locking cup 13, gasket 14, gasket 21, and a spring metal diaphragm ring 15 are then assembled and the cover 11 and handle 10 is welded to the locking cup 13. The projection welds for attaching cover 10 to locking cup 13 are oriented in such a manner that the vent holes 17 in the locking cup 13 are always opposite the voids or spaces 18 in the cover 11 and are never blocked by depressions 12, since if the depressions 12 are not oriented properly with respect to the vent holes 17, a restricted airflow may occur through the venting system.

Gasket 14 is somewhat compressed during welding between the flat surface of the locking cup 13 and the diaphragm 15. A circular sealing ring 19 is formed in diaphragm 15 to provide a seal at this point. The diaphragm 15 also has an extruded, circular lip at 20 to prevent the possibility of material from gasket 14 from being extruded into vent holes 17 which would restrict air flow through vent holes 17.

A gasket 21 is designed to be able to rotate freely when in position. When the cap is assembled on filler neck 22 the gasket 21 is compressed at point 23 providing a seal at this point around the entire diameter of the filler neck 22.

A valve assembly 25 is made from an upper valve body 26 and a lower valve body 27, a pressure relief spring 28, a resilient valve member 29, a valve seat 30 on body 27, a valve seat 31 located centrally on body 26, and a vacuum relief spring 32. The valve bodies 26 and 27 are made of organic plastic such as nylon. The upper and lower valve bodies 26, 27 are constructed to allow the parts to be snapped together against the interior spring forces and to retain the parts in position during welding. Diameter 32a of body 26, and diameter 33 of body 27 are interference fits. Both parts have undercut cast diameters adjacent to diameters 32a and 33. A chamfer 36 at end of body 26 is added to provide some lead in during assembly (FIG. 4). This construction allows the parts to be snapped together by simple manual or mechanical means. The interfering diameter and associated undercut diameters will not allow the valve body halves to be separated except by exterior physical force. When the above mentioned parts are held in the position shown the upper valve body 26 and lower valve body 27 are ultrasonically welded to form an air tight seal. Ultrasonic welding requires proper location of parts in a fixture but they must not be held in any manner which would adversely affect proper vibration of the parts which is essential to the operation. Once welded the parts exhibit an air tight bond around entire diameter at point 37.

Valve assembly 25 and a gasket 34 are then inserted in cup 13. A spring lock ring 35 frictionally engages cup 13 to retain valve assembly 25 in position. This operation compresses gasket 34 between the interior flat surface of the locking cup 13 and the sealing bead 38 on the valve body 26, forming an air tight seal. The fuel filler cap assembly is now completed.

When the fuel filler cap is applied to the filler neck 22 air tight seals are effected at points 19 and 23. This insures that the only path of air flow from the interior of the fuel tank to the atmosphere or vice versa, is through the valve assembly 25 itself, and the associated passages in the cover portion of the fuel filler cap.

By supporting the valve member 29 adjacent its periphery and its center, an intermediate flexible portion 29a is provided between outer annular portion 29b and an inner annular portion 29c. A backing member 40 is provided about the outer periphery of valve member 29 and a backing member 41 is provided about the inner periphery of valve member 29 against which the respective springs 28, 32 act. Inner portion 29b is held to the underside of seat 31 by spring 32. Spring 32 is weaker than spring 28 by such an amount that the outer portion 29c of member valve 29 is held in contact with the seat 30 by the force of spring 28.

The sealing surfaces are very critical to the design as there must be no leakage through the valve until the designed values of pressure differential between the fuel tank and the atmosphere are reached. These surfaces must be flat, smooth, and free of any surface irregularities. Because of aforementioned desire to weld the assembly air tight, and to provide a snap together method of assembly along with the surface conditions desired at diameters 30 and 31, plastics are chosen for the material for manufacturing parts 26 and 27. The surface of valve member 29 (both sides) are also important to this design. They must be resilient and also flat and free of imperfections. The material selected is a low durometer rubber. Normally these types of parts are die cut from commercially available sheet stocks. Molded construction may also be used.

As has been explained before, when the fuel filler cap is in place on filler neck 22, air tight seals are effected assuring that no air will flow through the fuel filler cap from the fuel tank to the atmosphere or vice versa except through the valve assembly 25 and only at those pressure differentials exceeding the limits for which the cap was designed.

When a positive pressure differential builds up to a predetermined value in the tank, the outer periphery 29c of valve member 29 moves upwardly against the action of spring 28. The valve member 29 will remain in this position until the pressure differential is reduced to the point where the force in spring 28 returns the valve member to the sealed position.

When a negative pressure differential builds up in the tank, the inner periphery 29b of valve member 29 will move downward. The valve member 29 remains in this position until the pressure differential is reduced to the point where the force in spring 32 can return the valve member to its sealed position.

Figure 2:
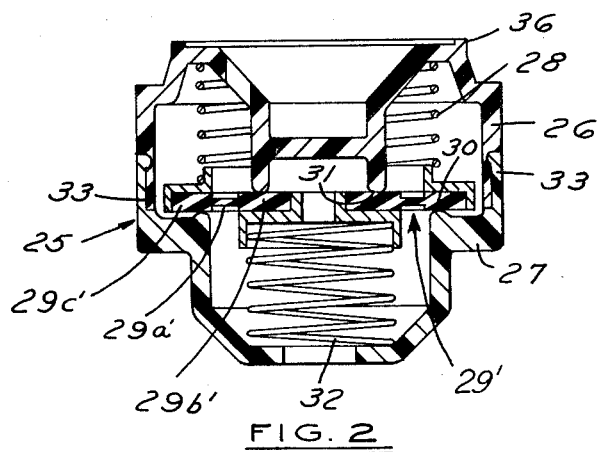
FIG. 2 is a vertical sectional view through a modified form of valve assembly which may be utilized in the fuel filler cap.

The form of the invention shown in FIG. 2 is substantially identical to that shown in FIG. 1 except that the intermediate annular portion 29a' of the valve member 29' is thinner than the peripheral portions 29b', 29c' permitting the valve member to operate at lower pressure differentials than is possible with the design shown in FIG. 1.

The form of the invention shown in FIG. 3 is similar to that shown in FIG. 2 except that the backing members 40, 41 are eliminated and the sealing member 29'' is provided with integral axial peripheral flanges 43, 44 which guide springs 28, 32 respectively.

I claim:

1. A pressure-vacuum relief fuel filler cap comprising a cover,
a downwardly opening locking cup fixed to the lower face of said cover generally centrally thereof,
a gasket and diaphragm ring interposed between said cover and said locking cup for providing a resilient force on the end of a filler neck,
a valve assembly fixed in said locking cup,
said valve assembly comprising a hollow upper valve body having a downwardly extending peripheral wall,
a hollow lower valve body having an upwardly extending peripheral wall,
means frictionally holding said lower valve body peripheral wall on said upper valve body peripheral wall,
a pressure relief valve and associated valve seat within said valve assembly,
and a vacuum relief valve and associated valve seat within said valve assembly,
said relief and vacuum valves including a diaphragm-like valve member having an annular outer valving portion and an annular inner valving portion connected by a flexible intermediate annular portion,
said lower valve body having a first valve seat against which the outer annular portion of said valve member is seated,
means yieldingly urging said first valving portion against said first valve seat,
said upper valve body having a second valve seat radially inwardly from its peripheral wall which is engaged by said second valving portion,
and means yieldingly urging said second valving portion against said second valve seat.

2. The combination set forth in claim 1 wherein said means interconnecting said valve bodies comprises interfitting telescoping portions.

3. The combination set forth in claim 2 wherein said telescoping portions include interengaging peripheral beads which snap over one another.

4. The combination set forth in claim 1 wherein said upper and lower valve bodies are made of plastic material.

5. The combination set forth in claim 1 including a spring member engaging said locking cup and said lower valve body to retain said valve assembly within said locking cup.

6. The combination set forth in claim 1 wherein said intermediate flexible annular portion has a lesser thickness than said outer and inner first and second valving portions of said valve member.

7. The combination set forth in claim 1 including means on the periphery of said first valving portion, said means yieldingly urging said valving portion against said first valve seat comprising a compression spring interposed between said upper valve body and said valving portion, and means on the periphery of said first valving portion laterally locating said spring.

8. The combination set forth in claim 7 wherein said means for guiding said spring comprises an annular member.

9. The combination set forth in claim 1 wherein said means yieldingly urging said second valving portion against said second valve seat comprises a compression spring interposed between said lower valve body and the second valving portion, and means on the inner periphery of said second valving portion for guiding the spring laterally.

10. The combination set forth in claim 9 wherein said means for guiding said spring comprises an integral portion of said valve member.

11. The combination set forth in claim 1 wherein said valve member is made of uniformly thick material.

12. The combination set forth in claim 1 including an annular spring member frictionally engaging the inner portion of said locking cup and said lower valve body and holding said valve assembly in position in said locking cup.

* * * * *